W. T. Mersereau.

Stair Rod Fastening.

No. 3,253. Reissued Jan. 5, 1869.

Witnesses.
James Louge
A. Turner

Inventor.
W. T. Mersereau by his attorney
Sidney Domo

N. PETERS, PHOTO-LITHOGRAPHER, WASHINGTON, D. C.

United States Patent Office.

WILLIAM T. MERSEREAU, OF NEWARK, NEW JERSEY.

*Letters Patent No.* 59,921, *dated November* 20, 1866; *reissue No.* 3,253, *dated January* 5, 1869.

IMPROVEMENT IN STAIR-RODS.

The Schedule referred to in these Letters Patent and making part of the same.

*To all whom it may concern:*

Be it known that I, WILLIAM T. MERSEREAU, of the city of Newark, in the State of New Jersey, have invented a certain new and useful Improvement in Stair and Vestibule-Rods; and do hereby declare the following to be a full, clear, and exact description thereof, reference being had to the accompanying drawings.

Of these drawings—

Figure 1:
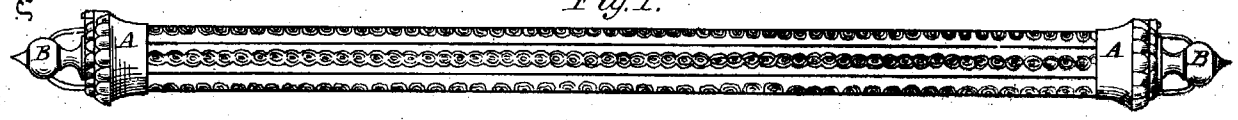
Figure 1 is a view of the rod, with the fastening attached.
Figure 2:
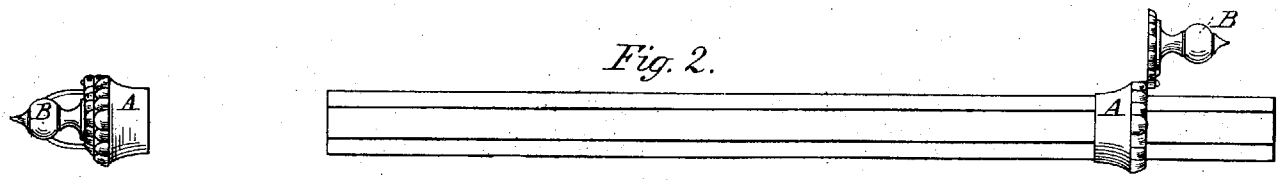
Figure 2 is a view of the rod, partially removed from the fastenings.
Figure 3:
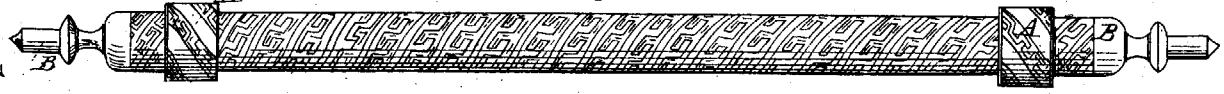

My improvement consists in combining, with the rod, rings having tips which will permit of being swung back, and free of such rings, and thus allow of the ready removal of the rod, such tips, when the rod is in place, forming a continuation of the rod, and presenting the appearance of a rod and tip all in one piece.

In the arrangement shown in the drawings—

A is one of the rings, upon the outer side of which is hinged or pivoted the tip B, so that it may turn freely over the opening in which is placed the rod, or away from the same.

One of the rings provided with a tip, is inserted, as stated, in the stair, and the tip is closed down over the opening in the ring. The opposite ring is placed in proper position in the stair, and the tip being thrown back from the opening, the rod is inserted beneath the same and the first-mentioned ring.

The tip previously thrown back may now be closed over the ring, and the rod will thus be firmly held in position.

When desired that the rod should be released, one of the tips may be thrown back from its ring, and the rod may then be removed from the rings.

Some of the peculiar advantages arising from the use of my improvement are that the rod is much more securely held in position, the cost of manufacture is materially reduced, and a much more ornamental and tasteful appearance is given to the rod.

Frequently one of the tips may be stationary, or form part of the ring itself, and the opposite ring be provided with a movable tip, to allow of the insertion and withdrawal of the rod.

*Claims.*

1. A stair or vestibule-rod, in combination with rings having tips operating in connection with such rings, substantially as described.

2. A ring in combination with a tip hinged to said ring, so that the tip will operate, substantially as described and shown, to permit of the removal of the rod.

Witnesses: WM. T. MERSEREAU.

EDWARD LYON, Jr.,

WM. F. MCNAMARA.